A. W. STRAIGHT.
ALCOHOL TORCH.
APPLICATION FILED JUNE 6, 1904.

911,086.

Patented Feb. 2, 1909.

3 SHEETS—SHEET 1.

WITNESSES:
J. E. Hooley
Charles McNellis

INVENTOR.
Asa W. Straight,
BY Michael J. Stark & Sons,
ATTORNEY.

A. W. STRAIGHT.
ALCOHOL TORCH.
APPLICATION FILED JUNE 6, 1904.
911,086.
Patented Feb. 2, 1909.
3 SHEETS—SHEET 2.
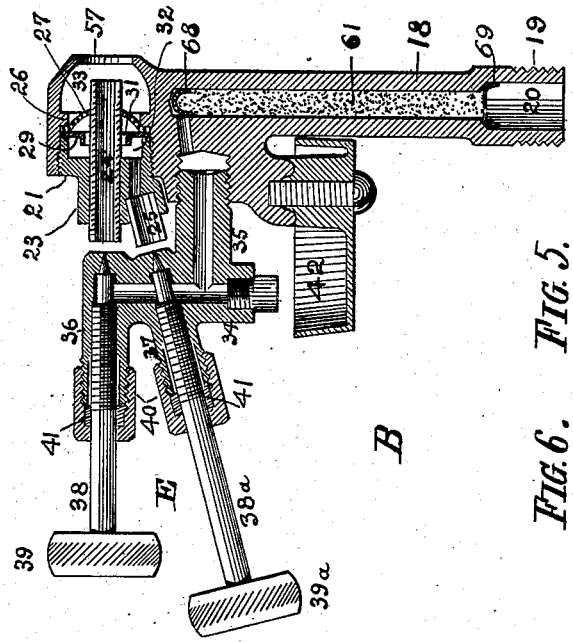
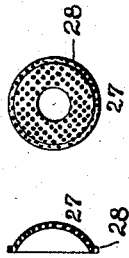
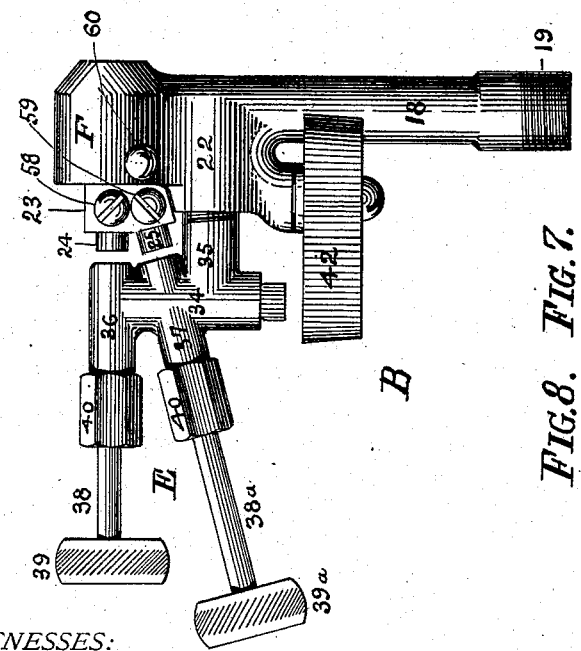
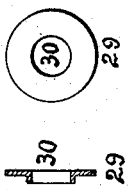
WITNESSES:
J. E. Gooley
Charles McNellis
INVENTOR.
Asa W. Straight,
BY Michael J. Stark Sons,
ATTORNEY.

A. W. STRAIGHT.
ALCOHOL TORCH.
APPLICATION FILED JUNE 6, 1904.
911,086.
Patented Feb. 2, 1909.
3 SHEETS—SHEET 3.
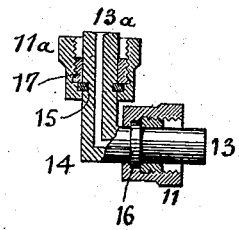
FIG. 13.
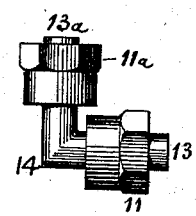
FIG 12.
FIG. 14.
FIG. 15.
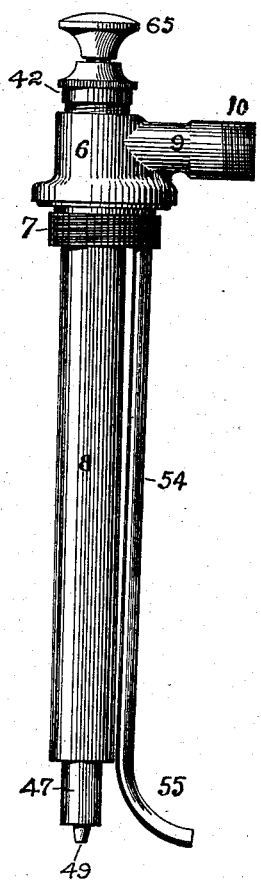
FIG. 9.
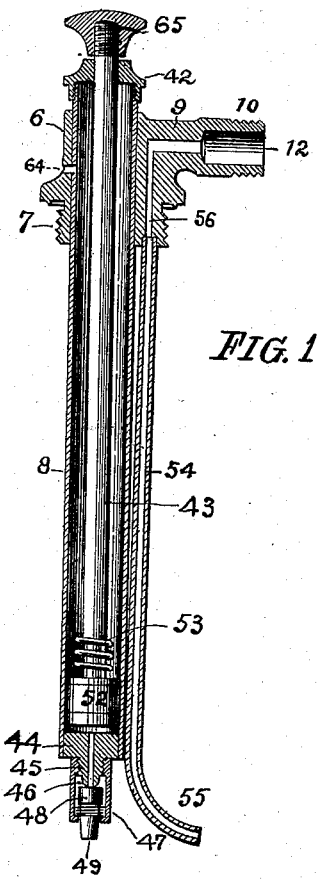
FIG. 10.
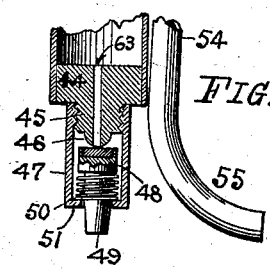
FIG. 11.
WITNESSES:
J. E. Gooley
Charles McNellis
INVENTOR.
Asa W. Straight,
BY Michael J. Stark & Sons,
ATTORNEY.

UNITED STATES PATENT OFFICE.

ASA W. STRAIGHT, OF CHICAGO, ILLINOIS, ASSIGNOR OF ONE-HALF TO THE TURNER BRASS WORKS, OF CHICAGO, ILLINOIS, A CORPORATION OF ILLINOIS.

ALCOHOL-TORCH.

No. 911,086.     Specification of Letters Patent.     Patented Feb. 2, 1909.

Application filed June 6, 1904. Serial No. 211,341.

*To all whom it may concern:*

Be it known that I, ASA W. STRAIGHT, a citizen of the United States, and resident of Chicago, in the county of Cook and State of Illinois, have invented certain new and useful Improvements in Alcohol-Torches; and I do hereby declare that the following description of my said invention, taken in connection with the accompanying sheets of drawings, forms a full, clear, and exact specification, which will allow and enable others skilled in the arts to which it appertains to make and use the same.

This invention has general reference to improvements in torches, and especially to that class of torches in which alcohol and other of the series "$C_2H_6O$" liquids are used as fuel; and it consists, essentially, of the novel and peculiar combination of parts and details of construction, as hereinafter first fully set forth and described, and then pointed out in the claims.

Figure 2:
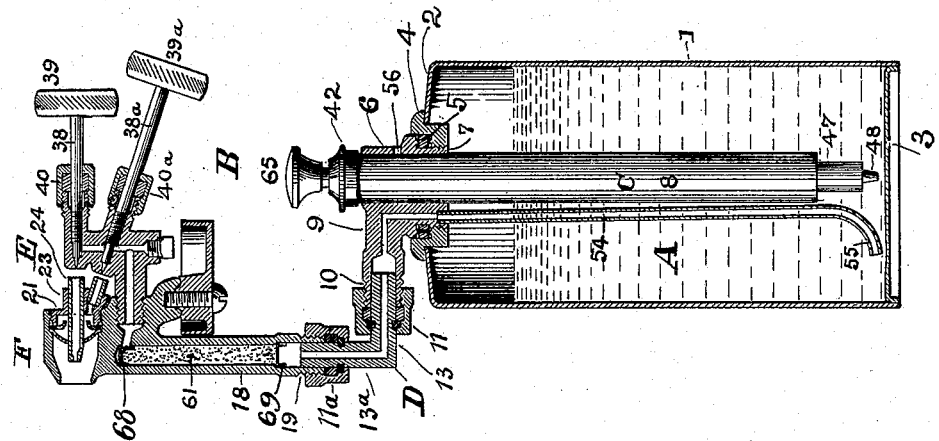
Figure 1:
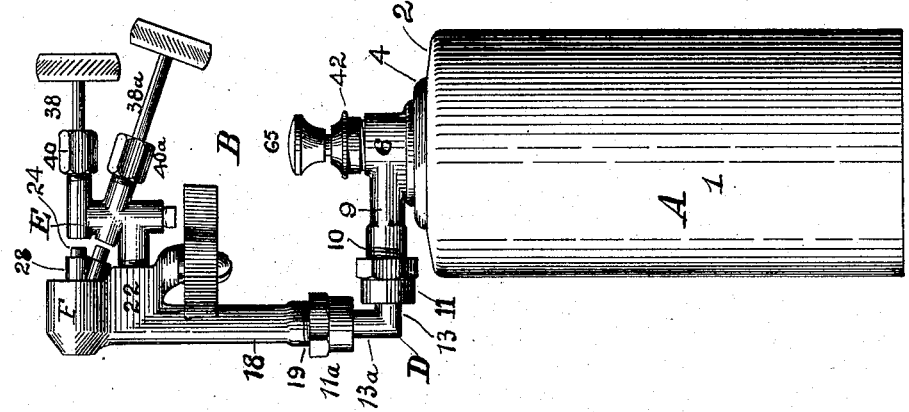

In the drawings already referred to, which serve to illustrate this invention more fully, Figure 1 is an elevation, and Fig. 2 a sectional elevation of this improved torch. Fig. 3 is an elevation, and Fig. 4 a sectional elevation of the burner detached. Fig. 5 is an end-view, and Fig. 6 a sectional elevation of the perforated cone. Fig. 7 is an end-view, and Fig. 8 a sectional elevation of the diaphragm. Fig. 9 is an elevation, and Fig. 10 a sectional elevation of the air-compressor detached. Fig. 11 is a similar view of the lower end of said compressor, drawn on a larger scale. Fig. 12 is an elevation, and Fig. 13 a sectional elevation of the swivel detached. Fig. 14 is an end-view, and Fig. 15 a side view of the split-ring.

Like parts are designated by corresponding symbols of reference in all the figures.

The object of this invention is the production of an efficient and serviceable torch in which alcohol and other liquids of the series "$C_2H_6O$" can be used as fuel to produce the required heat, it being a well-known and recognized fact that torches suitable for the hydrocarbon liquids, such as naphtha, gasolene, &c., are not adapted for the employment of alcohol, methyl alcohol, &c., owing to their different chemical combination of elements.

A in the drawings represents a tank, and B a burner for this alcohol torch. C is the air-pump or compressor. This tank A is, preferably, produced in the process of drawing or spinning, its shell 1 and its head 2 being formed integral, and its bottom 3 inserted and securely fastened therein by soldering, brazing or other suitable methods. In this head 2 there is a central opening into which an internally screw-threaded collar 4 is secured and tightly soldered, said collar being recessed to receive a packing-washer 5, coöperating with a head-piece 6, having a screw-threaded shank 7, engaging the collar 4, to make a tight joint and thereby to hermetically seal the tank A. The head-piece 6 is bored centrally to receive the pump cylinder 8 hereinafter to be referred to, and it is provided with a branch 9, to which is attached a swivel D, shown in detail in Figs. 12 and 13, which swivel serves as an intermediary between the tank and the burner. This branch 9 is externally screw-threaded at 10 to receive a nut 11, and it is centrally bored at 12 to engage a tail-piece 13, of an elbow 14, the two members or limbs of which are alike, they being both provided with an annular groove 15, into which are placed split-rings 16, shown in detail in Figs. 14 and 15, which are forced over the tail-pieces 13 into the annular grooves 15 and there form flanges to prevent the nuts 11 and 11ª, from leaving the tail-pieces or limbs 13 and 13ª. A suitable packing, preferably asbestos, is placed into the nuts 11, 11ª, to render the joints liquid-tight. This construction of the elbow enables the packing nut 11 being placed upon the elbow and then, by forcing the split-ring 16 into position in the groove in said elbow, to be permanently retained therein, which would not be possible were the split-ring or collar 16 an integral part of the elbow. By referring to Figs. 2 and 13, it will be seen that there is in the bottom of the coupling-nuts 11 and 11ª a recess wherein the split-collar 16 is located after the parts have been assembled. This recess fits the split collar a snug revolving fit so that the collar, after it has been inserted into the groove 15 of the tail-piece 13 and the packing-nut moved into the position shown in the figures, said split-collar 16 is prevented from opening, or moving out of its groove by said recess.

The burner B consists of a stand-pipe 18 having its lower end externally screw-threaded at 19, and internally bored at 20, the former to engage the nut 11ª, and the latter to receive the tail-piece 13ª. This stand-pipe terminates in the burner-head F below which there is a branch 22 to receive the fuel-supply regulating-valves E, shown more clearly in Figs. 3 and 4, and which will hereinafter be more fully described. This burner-head F is a cylindrical shell having its rear end internally screw-threaded to receive a plug 21, provided with a rearwardly-projecting boss 23, which is centrally bored to receive a tube 24, and which has a further bore at an oblique angle to engage a similar, but shorter, tube 25, both tubes being movably arranged in said boss for the purpose hereinafter specified. In the burner-head F there is an internal rim or ledge 26, against which is placed a perforated cup 27, against the flange 28 of which bears a diaphragm 29, both of which are held in position by the plug 21 forcing them against the ledge 26. In the diaphragm 29 shown in detail in Figs. 7 and 8, there is a central opening 30, larger in diameter than the external diameter of the tube 24 to afford an annular passage 31, for the escape of the gas issuing from the tube 25. These two parts 27 and 29 divide the interior of the burner-head into two chambers 32 and 33, as clearly illustrated in Fig. 4.

The fuel-supply regulating-valves consist of a peculiarly-shaped body the central, tubular, portion 34 of which has near its lower end a tubular branch 35, which is externally screw-threaded to engage the lateral branch 22 already referred to, and which terminates in a horizontal tube 36. Below this latter tube there is another, obliquely-arranged, tube 37, both of which are internally screw-threaded, and the bore of which terminates in very minute orifices through which the gas escapes in a fine, but forceful, stream. Within these tubes are placed the usual needle-valve rods 38 and 38ª, and which are fitted with handles or knobs 39, 39ª, for the purpose of manipulating said valve-rods. The free ends of the two tubes 36 and 37 are externally screw-threaded to engage packing-nuts 40 which are supplied with asbestos packing 41, to prevent any escape of gas from these tubes except through the minute orifices heretofore referred to. Below the valve-body E there is provided a drip-cup 42, of sufficient capacity to hold an ample supply of liquid fuel to heat the burner and initiate the generation of gas.

The air-compressor used in this torch consists of the pump-cylinder 8, the upper end of which is permanently secured to, and passes through, the head-piece 6. It is closed at its upper end by a cap 42, through which the piston-rod 43 passes, and which is provided at its upper end with a knob or handle 65, for ease of operation. The lower end of this cylinder is closed with a plug 44, having a nipple, 45, the end of which is formed into a hemispherical valve-seat 46. This nipple is externally screw-threaded to engage a sleeve 47, serving as a valve-chamber to contain a valve 48, the stem 49 of which passes through the lower end of this sleeve. A spiral spring 50, is interposed between the valve and a shoulder 51, in said sleeve to keep this valve in a normally closed position.

52 is the usual piston, and 53 a spiral spring above the same to prevent the piston striking the cap 42 when the pump is being operated.

54 is the fuel discharge pipe. Its lower end is curved at 55 to bring the ingress opening near the wall of the shell 1. Its upper end is permanently secured to the screw-threaded shank 7, a passage 56, in this shank and the head-piece 6 establishing communication between the discharge tube 54 and the branch 9 on the head-piece, and through it and the elbow 14 to the burner proper.

It will now be observed that through the instrumentality of the swivel connection D the burner proper B is movably connected with the tank A in such a manner that it may be revolved in a vertical plane around the branch 9 and in a horizontal plane around the limb 13ª of the elbow 14, thereby enabling the burner being placed into any desired position irrespective of the position of the tank A, which is quite a desideratum in torches of the class described, especially so when the torch is to be used in confined places. The operation of this torch is substantially as follows.

The tank A being supplied with alcohol by removing, and pressure produced therein after replacing, the pump C; this pressure causes the liquid fuel to rise in the tube 54 and to pass through the passage 56 in the head-piece, and through the passage in the elbow 14 into the stand-pipe 18, from whence it passes through a passage in the lateral branch 22 into the valve-body E. Now the lower valve 38ª is opened to allow of an escape of the liquid and to fill the drip-cup 42. This liquid, being ignited, heats the burner-body sufficiently to vaporize the alcohol contained therein and to eject it through the minute orifice into the tube 25 and the chamber 32 from whence it passes through the central passage 30 and the perforations in the cone 27 into the chamber 33, and then issues from the burner-head through the opening 57. This gas being ignited in turn, keeps up sufficient heat to continue generation of gas. Now the upper valve 38 is opened to cause an escape of vapor into the upper tube 24, and to issue from its forward end through the center of the lower flame and to unite therewith, thereby producing a long and slender but intensely hot flame which terminates in a fine point and which is, therefore, especially desirable for all purposes where a concentrated flame is a necessity.

This torch, while adapted for all uses in the arts where an intensely hot flame perfectly free from unconsumed, or partly-consumed carbon is a necessity, is especially suitable for lead-burning owing to its intense heat, its concentrated flame, and its absolute purity.

In order to assist in the conducting of heat downwardly in the stand-pipe 18 and the vaporization of the liquid therein, the bore of this stand-pipe is closely packed with granular metallic particles 61, Fig. 4, and I have discovered that brazing-spelter, an alloy of copper and zinc, being a good conductor of heat, is especially well adapted for this purpose, and that it also acts as a filter to intercept any solid substance that may be contained in the liquid fuel and thereby to prevent its reaching the minute orifices in the valve-bodies which would clog them and otherwise prevent the proper functioning of this torch. This granulated metallic filling is confined within the bore of the stand-pipe by two perforated plates or cups 68 and 69 located above and below said filling, as shown in Figs. 2 and 4, which prevent the granulated metallic filling from dropping out of the bore of the stand-pipe, and from passing into the veins of the burner.

In this torch it is essential that the supply of oxygen passing into the tubes 24 and 25 with the injected gases be properly proportioned, and in order to secure this result, the tubes are laterally movable within the burner-head so that by moving them toward or from the valve-tubes 36 and 37, the space between them and the ends of the tubes 24 and 25 is increased or diminished, as the case may be, and consequently the amount of air which can be admitted to these tubes along with the injected gases. This supply of air, however, needs not be as ample as that required for the hydrocarbon liquids for the reason that alcohol, ether, methylated spirits &c. contain oxygen as one of their constituent elements, which is not, or insufficiently present in the hydrocarbon liquids.

In this torch it is, furthermore, essential, that the discharge-valve in the pump, being submerged in the liquid, be perfectly tight to prevent alcohol from entering the pump-cylinder and passing the piston therein, (which it is almost impossible to make perfectly tight and still easily operated) to escape from the upper end of the pump-cylinder. I have after many experiments invented the construction shown and described. Thus the lower end of the nipple 45 is formed hemi-spherical and the upper face of the valve 48 recessed and supplied with a cork-washer, which bears upon the spherical seat and closes the discharge passage 63 in the plug 44 perfectly tight. This construction of the pump is the only one which I have found to function perfectly satisfactory. I have also discovered that in this torch a solid piston is the more desirable one since when the piston is moved upwardly, a partial vacuum is formed in the cylinder whereby the valve is drawn the more tightly to its seat. Air is admitted to the cylinder through an opening 64 in the upper end thereof after the piston has moved upwardly beyond this opening.

Having thus fully described this invention, I claim as new and desire to secure to me by Letters Patent of the United States—

1. In a torch, a union elbow and swivel combined consisting of a metallic, right angle, tube having a groove in both of its members; coupling-nuts upon said members, and split rings within said nuts and engaging said grooves, there being a recess in the bottom of each nut engaging said split-ring, whereby the nuts may be placed upon said members and then prevented from being removed therefrom by the insertion of the split-rings into said grooves and nuts.

2. In an alcohol torch, a burner, consisting, essentially, of a stand-pipe having near its upper end a branch, and terminating in a cylindrical shell the axis of which is at right angles to that of the stand-pipe; an angle-valve piece secured to said branch and having two supply-regulating valves, one of which is in axial line with the said shell, and the other at an oblique angle thereto; a plug in the said shell having adjustably-arranged mixing-tubes in line with the axial lines of the supply-regulating valves; a diaphragm in said shell having a central opening larger than the central mixing tube passing through the same, and a perforated cone in front of said diaphragm.

3. In a torch, a tank; an internally-screw-threaded collar in the head of said tank; a head-piece having an external screw-thread adapted to engage the internal screw-thread of said collar; a branch on said head-piece; a feed tube in said tank and engaging said head-piece; a pump-cylinder passing through said head-piece and permanently affixed thereto, a cap on the outer end of said pump-cylinder, a piston in said pump-cylinder having a rod and handle; a plug in the bottom of said cylinder and having an internally screw-threaded nipple terminating in a semi-spherical valve-seat; a sleeve over said nipple; a valve within said sleeve, and a spiral spring therein supporting said valve, and a burner attached to said branch, whereby, by removing the head-piece, the entire pump with its accessories the feed pipe and the burner may be removed from the tank and the latter filled through the collar.

In testimony that I claim the foregoing as my invention I have hereunto set my hand in the presence of two subscribing witnesses.

A. W. STRAIGHT.

Attest:
THOMAS R. FERRIS,
FRANK A. REID.